United States Patent
Horie et al.

(10) Patent No.: US 10,199,844 B2
(45) Date of Patent: Feb. 5, 2019

(54) POWER-SUPPLYING DEVICE

(71) Applicant: Hitachi Koki Co., Ltd., Tokyo (JP)

(72) Inventors: Yuki Horie, Hitachinaka (JP); Yasushi Nakano, Hitachinaka (JP); Kazuhiko Funabashi, Hitachinaka (JP)

(73) Assignee: Koki Holdings Co., Ltd., Tokyo (JP)

( * ) Notice: Subject to any disclaimer, the term of this patent is extended or adjusted under 35 U.S.C. 154(b) by 0 days.

(21) Appl. No.: 14/654,899

(22) PCT Filed: Dec. 25, 2013

(86) PCT No.: PCT/JP2013/007589
§ 371 (c)(1),
(2) Date: Jun. 23, 2015

(87) PCT Pub. No.: WO2014/103306
PCT Pub. Date: Jul. 3, 2014

(65) Prior Publication Data
US 2015/0340894 A1 Nov. 26, 2015

(30) Foreign Application Priority Data

Dec. 28, 2012 (JP) ................................ 2012-288526
Dec. 28, 2012 (JP) ................................ 2012-288527

(51) Int. Cl.
*H02J 7/00* (2006.01)
(52) U.S. Cl.
CPC ............ *H02J 7/0045* (2013.01); *H02J 7/007* (2013.01); *H02J 7/0026* (2013.01);
(Continued)
(58) Field of Classification Search
CPC .................................................. H02J 7/0045
(Continued)

(56) References Cited

U.S. PATENT DOCUMENTS 5,783,998 A * 7/1998 Nakajou ............ G01R 31/3655
324/426
6,087,815 A * 7/2000 Pfeifer ...................... B25F 5/00
323/282
(Continued)

FOREIGN PATENT DOCUMENTS

CN 1967964 A 5/2007
CN 1967966 A 5/2007
(Continued)

OTHER PUBLICATIONS

Japan Patent Office office actions JPO patent application 2012-288526 (dated Sep. 15, 2016).
(Continued)

*Primary Examiner* — Samuel Berhanu
*Assistant Examiner* — Tessema Kebede
(74) *Attorney, Agent, or Firm* — Kilpatrick Townsend & Stockton LLP (57) ABSTRACT

A power-supplying device includes a terminal, a rechargeable battery, a first shutdown circuit, and a second shutdown circuit. The terminal is configured to be connected to a power tool. The rechargeable battery is configured to output electrical power to the power tool via the terminal. The first shutdown circuit is positioned at a plus side of the rechargeable battery, the first shutdown circuit being configured to shutdown output of the rechargeable battery. The second shutdown circuit is positioned at a minus side of the rechargeable battery. The second shutdown circuit is configured to shutdown output of the rechargeable battery.

20 Claims, 3 Drawing Sheets (52) U.S. Cl.
CPC .......... *H02J 7/0031* (2013.01); *H02J 7/0047* (2013.01); *H02J 7/0052* (2013.01); *H02J 2007/004* (2013.01)

(58) Field of Classification Search
USPC ........................................................ 320/107
See application file for complete search history.

(56) References Cited

U.S. PATENT DOCUMENTS

| | | | |
|---|---|---|---|
| 6,489,749 B1* | 12/2002 | Nakashimo | G01R 31/3624 320/134 |
| 8,228,037 B2 | 7/2012 | Furukawa et al. | |
| 9,203,249 B2* | 12/2015 | Noda | H01M 10/44 |
| 9,318,902 B2 | 4/2016 | Kurayama | |
| 2006/0126249 A1* | 6/2006 | Boling | H02J 7/0031 361/103 |
| 2007/0108940 A1* | 5/2007 | Sainomoto | H02J 7/0026 320/112 |
| 2007/0108941 A1 | 5/2007 | Sainomoto et al. | |
| 2009/0184685 A1 | 7/2009 | Sim et al. | |
| 2009/0200982 A1 | 8/2009 | Hurtz et al. | |
| 2010/0127663 A1* | 5/2010 | Furukawa | B60L 3/0046 320/134 |
| 2011/0080140 A1 | 4/2011 | Hogari et al. | |
| 2011/0163723 A1* | 7/2011 | Tan | H02J 7/0029 320/134 |
| 2012/0326531 A1 | 12/2012 | Kawamoto et al. | |

FOREIGN PATENT DOCUMENTS

| | | |
|---|---|---|
| CN | 101593990 A | 12/2009 |
| CN | 102842929 A | 12/2012 |
| EP | 1788686 A2 | 5/2007 |
| JP | 07-3983 U | 1/1995 |
| JP | 08-308121 A | 11/1996 |
| JP | 10-271693 A | 10/1998 |
| JP | 2001-054242 A | 2/2001 |
| JP | 2004-304940 A | 10/2004 |
| JP | 2005-131770 A | 5/2005 |
| JP | 2005-285458 A | 10/2005 |
| JP | 2009-095162 A | 4/2009 |
| JP | 2009-178017 A | 8/2009 |
| JP | 2009-238538 A | 10/2009 |
| JP | 2010-93953 A | 4/2010 |
| JP | 2010-130768 A | 6/2010 |
| JP | 2010-162656 A | 7/2010 |
| JP | 2011-015463 A | 1/2011 |
| JP | 2011-078282 A | 4/2011 |
| JP | 2011-229319 A | 11/2011 |
| WO | WO2012-086645 A1 | 6/2012 |

OTHER PUBLICATIONS

China Intellectual Property Office office action for application 201380067984.9 dated Dec. 21, 2016.
International Report on Patentability for application PCT/JP2013/007589 (dated Jul. 9, 2015), 9 pages.
International Search Report for application PCT/JP2013/007589 (dated Jul. 25, 2014), 13 pages.
Third Party Observation for application PCT/JP2013/007589, (dated Apr. 17, 2015), 17 pages.
Japan Patent Office office actions JPO patent application JP2012-288527 (dated May 30, 2016).
Japan Patent Office Decision of Dismissal of Amendment for JPO patent application JP2012-288526 (dated May 15, 2017), 6 pages.
Japan Patent Office Report for Reconsideration patent application JP2012-288526 (dated Sep. 6, 2017), 6 pages.
China Patent Office office action for patent application CN201380067984.9 (dated Mar. 26, 2018), 17 pages with translation.
Japan Patent Office Office Action for patent application JP2012-288526 (dated Sep. 3, 2018), 10 pages with translation.

* cited by examiner

POWER-SUPPLYING DEVICE

TECHNICAL FIELD

The present invention relates to a power-supplying device.

BACKGROUND ART

Motor-driven power tools and similar devices have conventionally been connected to a commercial AC power source, a DC constant-voltage power source, and the like, but a growing number of power tools are now equipped with a secondary battery. Power tools employing a secondary battery are also referred to as cordless power tools. As these power tools continue to expand in type and application, the demand for greater battery capacity increases. While the battery pack for powering these power tools has traditionally been mounted directly on the body of the tool, a waist-belt-type power supply has also been proposed in the patent literature listed below. This power supply accommodates rechargeable batteries in a waist belt that can be worn about the user's waist.

CITATION LIST

Patent Literature

Japanese Utility Model Application Publication H7-3983

SUMMARY OF INVENTION

Solution to Problem

However, the waist-belt-type power supply has a limitation in the number of rechargeable batteries it can accommodate. There is a need for a portable power supply for power tools and the like that has a larger capacity than a waist-belt-type power supply and that is commercially viable. Such a large capacity portable power supply must be capable of accommodating a large array of secondary cells, such as lithium-ion secondary cells, within a case. This arrangement would increase the amount of energy that a portable power supply could output (the output current).

Consequently, such a power supply could output a larger current than a conventional device if the internal resistance of the power tool and power supply is low or if the output terminals of the power supply are short-circuited, for example. Traditionally, a fuse or other irreversible current-interrupting element has been provided to prevent output from a power supply during a short circuit. However, restoring output after the conventional interrupting circuit has interrupted power can be troublesome. Further, when a fuse is used in a high-capacity portable power supply, the output current tends to increase as mentioned above before the fuse or the like melts. For these reasons, there is a need to come up with a new solution.

It is becoming more common to connect such high-capacity power supplies to power tools possessing capacitors of relatively high capacity. Thus, when the power tool is first connected to the power supply or at the instant the power tool is first driven, an inrush current depending on the size of the capacitor may flow from the power supply to the power tool. Depending on its size, this inrush current can trigger an overdischarge protection circuit designed to limit output from the power supply in order to protect the power tool from overdischarge. Consequently, the power tool may become temporarily inoperable in some cases, even though the power supply has sufficient battery power remaining. Although, inrush currents may not have presented much problem for conventional small-capacity power supplies, there is a particular need to address this issue for large-capacity power supplies that are capable of supplying more power.

In view of the foregoing, it is an object of the present invention to provide a power-supplying device that can quickly but reversibly shut down a circuit when a large current is produced in order to suppress inrush currents that can occur when the powered device is first operated.

In addition, the high-capacity power supply described above can produce a large output. Thus, it is necessary to provide a battery protection circuit that monitors the state of the secondary batteries and to provide specific measures, such as means for interrupting output before an abnormality occurs in the battery. The need for a battery protection circuit is greater when using a lithium-ion battery as the secondary battery because it is necessary to prevent overdischarge and overcharge in the secondary battery.

However, since the battery protection circuit is driven by the secondary battery of the power supply, the protection circuit is consuming power, even when the battery supply is not supplying power to a power tool. Thus, the power of the power supply is not being used effectively.

Further, if the power supply is configured to simply shutdown the battery protection circuit when power is not being supplied to a power tool, the power supply may not be able to sufficiently deal with any kind of abnormality that may occur during this state.

In view of the foregoing, it is also an object of the present invention to provide a power-supplying device that efficiently operates a monitoring device for monitoring the voltage of the secondary battery in order to reduce power consumption.

In order to attain the above and other objects, the invention provides a power-supplying device. The power-supplying device includes a terminal, a rechargeable battery, a first shutdown circuit, and a second shutdown circuit. The terminal is configured to be connected to a power tool. The rechargeable battery is configured to output electrical power to the power tool via the terminal. The first shutdown circuit is positioned at a plus side of the rechargeable battery, the first shutdown circuit being configured to shutdown output of the rechargeable battery. The second shutdown circuit is positioned at a minus side of the rechargeable battery. The second shutdown circuit is configured to shutdown output of the rechargeable battery.

According to another aspect, the present invention provides a power-supplying device. The power-supplying device includes a terminal, a rechargeable battery, a monitoring unit, and a shutdown circuit. The terminal is configured to be connected to one of a power tool and a charging device. The rechargeable battery includes a plurality of battery cells. The rechargeable battery is configured to output electrical power to the power tool connected to the terminal and configured to be charged by the charging device connected to the terminal. The monitoring unit has an output port and is configured to be switched between a monitoring mode and a standby mode. In the monitoring mode the monitoring unit monitors a voltage of at least one of the plurality of battery cells, and outputs a signal via the output port when the voltage of one of the plurality of battery cells is in a prescribed first range. The shutdown circuit is configured to interrupt the signal via the output port when the monitoring unit is in the standby mode.

Advantageous Effects of Invention

According to the invention, the power-supplying device includes a first shutdown circuit positioned at a plus side of the rechargeable battery and a second shutdown circuit positioned at a minus side of the rechargeable battery. Thus, the power-supplying device can reliably shutdown output of the rechargeable battery by the first shutdown circuit and the second shutdown circuit when an error occurs in the power-supplying device.

Further, according to the invention, in the monitoring mode the monitoring unit monitors a voltage of at least one of the plurality of battery cells, and outputs a signal via the output port when the voltage of one of the plurality of battery cells is in a prescribed first range and the shutdown circuit configured to interrupt the signal via the output port when the monitoring unit is in the standby mode. Thus, the power consumption of the monitoring unit can be reduced.

DESCRIPTION OF EMBODIMENTS

Figure 1:
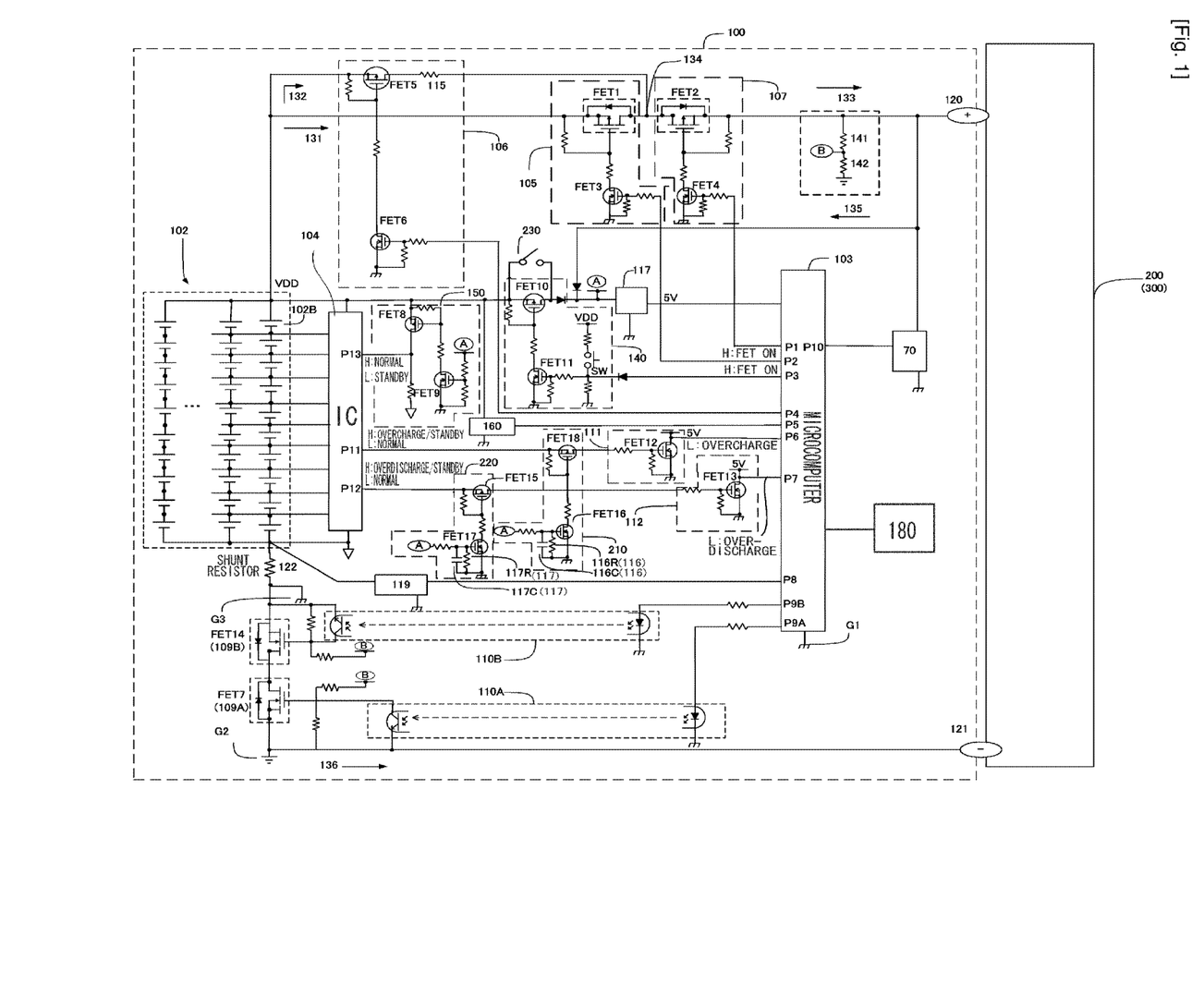
FIG. 1 is a circuit diagram of a battery pack according to an embodiment of the present invention.

FIG. 1 shows a battery pack 100 according to an embodiment. The battery pack 100 is capable of connecting to a cordless power tool 200, or a charging device 300. As shown in FIG. 1, the battery pack 100 includes a microcomputer 103, a battery protection IC 104, a battery set 102, a positive output terminal 120, and a negative output terminal 121. When the battery pack 100 is connected to the cordless power tool 200, power outputted from the battery set 102 is inputted into the cordless power tool 200 via the terminals 120 and 121. When the charging device 300 is connected to the battery pack 100, the battery set 102 is charged.

The battery set 102 includes a plurality of secondary cells 102B connected in series to produce a high output, with a plurality of these serial cell units connected in parallel. In the embodiment, the battery cell 102B is a lithium-ion battery. The battery pack 100 is a backpack-style power supplying device which can be worn on the user's back, for example. However, the battery pack 100 according to the present invention is not limited to the backpack-style power-supplying device, which is as an example of a high-capacity power supply, provided that the battery pack 100 is configured of secondary cells. For example, the present invention may be applied to any structure capable of resolving the problems associated with the prior art, including a small battery pack that is integrally mounted on the power tool 200, a waist-belt battery supply that can be worn about the user's waist, as well as the backpack-style power supply.

The microcomputer 103 has various ports P1-P8, P9A, P9B, and P10, and a ground potential G1.

The output path on the high side (positive output side) of the battery set 102 branches into a first path 131 serving as the main output line, and a second path 132 serving as a bypass line. The first and second paths 131 and 132 connect to a common third path 133 at a connection point 134. The third path 133 is connected to the positive output terminal 120.

Each of the above paths in the battery pack 100 is provided with a shutdown circuit. Specifically, a shutdown circuit 105 is provided on the first path 131, a shutdown circuit 106 is provided on the second path 132, and a shutdown circuit 107 is provided on the third path 133.

The shutdown circuit 105 is provided with a p-channel FET 1, and an n-channel FET 3, for example. The drain of the FET 3 is connected to the gate of the FET 1 through a resistor, and the gate of the FET 3 is connected to the port P2 of the microcomputer 103 through another resistor. The FET 3 and the FET 1 are switched on and off by switching the signal from the port P2 between high and low. The shutdown circuit 105 conducts electricity over the first path 131 when the FET 3 and the FET 1 are on, and interrupts this electricity when the FET 3 and the FET 1 are off.

The shutdown circuit 106 includes a p-channel FET 5, an n-channel FET 6, and a resistor 115. The FET 5 and the resistor 115 are provided on the second path 132. The drain of the FET 6 is connected to the gate of the FET 5 through a resistor, and the gate of the FET 6 is connected to the port P4 of the microcomputer 103 through another resistor. The FET 6 and the FET 5 are switched on and off by switching the signal from the port P4 between high and low. The shutdown circuit 106 conducts electricity over the second path 132 when the FET 6 and the FET 5 are on, and interrupts the electricity when the FET 6 and the FET 5 are off. The resistor 115 functions to limit the output current of the battery set 102 as the current flows through the shutdown circuit 106, thereby regulating output to the third path 133.

The shutdown circuit 107 includes a p-channel FET 2, and an n-channel FET 4. The FET 2 is provided on the third path 133. The drain of the FET 4 is connected to the gate of the FET 2 through a resistor, and the gate of the FET 4 is connected to the port P1 of the microcomputer 103 through another resistor. The FET 4 and the FET 2 are switched on and off by switching the signal from the port P1 between high and low, thereby conducting or interrupting current flow on the third path 133.

The FET 1 and the FET 2 provided on the output paths 131, 132, and 133 are configured to handle a large allowable peak current in anticipation of the peak currents (instantaneous currents) being large. In the embodiment, the allowable peak current of the FET 1 and the FET 2 is approximately 400 amperes (A) for a duration of 10 msec. On the other hand, since the FET 3, FET 4, and FET 6 constitute drive units for driving the FET 1, FET 2, and FET 5, respectively, these FETs employ faster elements than the FET 1, FET 2, and FET 5 in order to support on/off switching operations. That is, the FETs 3, 4, and 6 switch on and off faster than the corresponding FETs 1, 2, and 5.

When the FET 1 and the FET 2 are on while the FET 5 is off, the output voltage and the current from the battery set 102 are supplied unchanged along the first path 131 and the third path 133 to the positive output terminal 120. However, when the FET 5 and the FET 2 are on and the FET 1 is off, the power from the battery set 102 is supplied to the positive output terminal 120 along the second path 132 and third path 133. In this case, the resistor 115 limits the current flowing from the battery set 102.

An output voltage detection circuit 70 is provided between the positive output terminal 120 and the microcomputer 103. The output voltage detection circuit 70 detects the voltage on the third path 133 and outputs the detected voltage to the microcomputer 103.

A low-side output path 136 is provided between the low side (negative side) of the battery set 102 and the negative output terminal 121. Low-side shutdown circuits 109B and 109A are provided on the low-side output path 136 in this order from the battery set 102. The low-side shutdown circuits 109A and 109B are configured of an n-channel FET 7 and an n-channel FET 14, respectively. A shunt resistor 122 is provided on the low-side output path 136 between the low-side shutdown circuits 109A and 109B and the battery set 102. The low-side shutdown circuit 109A interrupts electric current during charging, while the low-side shutdown circuit 109B interrupts electric current during discharging.

As with the FET 1 and the FET 2, the FET 7 and the FET 14 are configured to handle a large allowable peak current in anticipation of a large current flowing through the same. Here, the FET 7 and the FET 14 are preferably configured of elements exhibiting different properties from the FET 1 and the FET 2 under the allowable peak current and other conditions. Resistors 141 and 142 are provided on the third path 133 of the positive output terminal 120 side described above for dividing the voltage applied to the third path 133. A divided voltage B produced by the resistors 141 and 142 from a reference (ground) potential G2 passes through resistors and is supplied to the gates of the FET 7 and the FET 14 via resistors. Note that the ground (reference) potential G2 at which the low-side shutdown circuit 109A is grounded differs from the ground potential G1. The ground potential G1 is equivalent to a reference potential G3 on the bottom end of the shunt resistor 122. Separating the reference potentials of the microcomputer 103 and the low-side shutdown circuit 109A in this way makes it possible to constantly stabilize the source potential of the FET 7 and the FET 14 and the reference potential of the microcomputer 103, regardless of whether the FET 7 and the FET 14 are on or off.

A photocoupler 110A optically connects the port P9A to the low-side shutdown circuit 109A. The photocoupler 110A switches the FET 7 on and off respectively in response to a high signal and a low signal from the microcomputer 103, thereby controlling whether power from the battery set 102 is supplied or interrupted. Thus, the photocoupler 110A can switch the power supply from the battery set 102 on and off while electrically isolating the microcomputer 103 and the FET 7.

Similarly, a photocoupler 110B optically connects the port P9B to the low-side shutdown circuit 109B. The photocoupler 110B switches the FET 14 on and off respectively in response to a high signal and a low signal from the microcomputer 103, thereby controlling whether power from the battery set 102 is supplied or interrupted. Thus, the photocoupler 110B can switch the power supply from the battery set 102 on and off while electrically isolating the microcomputer 103 and the FET 14.

The photocouplers 110A and 110B are provided to enable signal transmission between the microcomputer 103 having the reference potential G1, and the FET 7 and the FET 14 having the different reference potential G2. Any other means that achieves the same purpose may be employed, such as an electromagnetic relay or a transformer.

A short-circuit current detection circuit 119 is provided on the low side of the battery set 102. The short-circuit current detection circuit 119 detects a short circuit between the positive output terminal 120 and the negative output terminal 121 when the output current is greater than or equal to a prescribed value. In the embodiment, the short-circuit current detection circuit 119 inputs a short-circuit signal into the port P8 of the microcomputer 103 upon detecting a short circuit, and the microcomputer 103 shuts down the FET 1 and FET 14 in response to this signal. Here, the short-circuit current detection circuit 119 may be configured of a latch circuit for holding the short-circuit signal, as well as or instead of inputting the short-circuit signal into the microcomputer 103, and may be provided with a drive circuit for turning off the FET 1 and FET 14 based on the signal held by the latch circuit.

A voltage Vdd on the plus side of the battery set 102 is supplied to the microcomputer 103 via a switching circuit 140 and a step-down circuit 117. The switching circuit 140 includes a switch SW, an FET 10 and an FET 11. The FET 11 connects port P3 to the FET 10. The switch SW can be toggled by the user. When the switch SW is on, a voltage Vdd is applied to the FET 11 through resistors, turning both the FET 11 and the FET 10 on, whereby the voltage Vdd is applied to the step-down circuit 117. The step-down circuit 117 applies a lower voltage than the voltage Vdd to the microcomputer 103 in order to start up the microcomputer 103. In the embodiment, the voltage applied to the microcomputer 103 is 5 V, for example.

A thermal protector switch 230 is provided between the source and drain of the FET 10. The thermal protector switch 230 switches on and off based on its own temperature. In the embodiment, the thermal protector switch 230 turns on when rising to at least a prescribed temperature (100 degrees Celsius, for example) and turns off when below the prescribed temperature. The thermal protector switch 230 is positioned near the battery set 102 for monitoring the temperature of the battery set 102. If the temperature of the battery set 102 rises above the prescribed temperature, the thermal protector switch 230 will turn on, allowing power to be supplied to circuits connected to a voltage A (described below) such as the step-down circuit 117, and the microcomputer 103, even if the FET 10 is not driven and the microcomputer 103 is in a sleep state because a charger is not connected thereto. The thermal protector switch 230 may also be provided with a speaker 180 or other notification device for notifying the user that the temperature of the battery set 102 has risen when the thermal protector switch 230 turns on.

A charging path 135 is provided between the positive output terminal 120 and the step-down circuit 117. When the charging device 300 is connected to the battery pack 100, the charging device 300 applies a voltage to the step-down circuit 117 through the charging path 135. The voltage applied by the charging device 300 is stepped down by the step-down circuit 117 before being applied to the microcomputer 103 and functions to start up the microcomputer 103. Hereinafter, the voltage inputted into the step-down circuit 117 will be called a voltage A.

The battery protection IC 104 monitors the secondary cells 102B of the battery set 102 to determine whether the voltage at any secondary cell 102B is higher than or equal to a prescribed upper limit under normal use (hereinafter called an "overcharge voltage") and whether the voltage of any secondary cell 102B is lower than or equal to a prescribed lower limit for normal use (hereinafter called an "overdischarge voltage"). The battery protection IC 104 includes ports P11-P13. The battery protection IC 104 can be switched between a normal mode and a standby mode. The battery protection IC 104 monitors overcharge (overvoltage) and overdischarge of the secondary cells 102B only during the normal mode. In the standby mode, the battery protection IC 104 does not monitor overcharge and overdischarge of the secondary cells 102B and either consumes no power or consumes far less power than that consumed during the normal mode (an amount small enough to be negligible, i.e., small enough not to affect the secondary battery, even when the secondary cells 102B have less than or equal to the overdischarge voltage). In other words, in the standby mode, electric power to at least part of the battery protection IC 104 is interrupted, and thus the at least part of the battery protection IC 104 does not consume electric power. In the embodiment, the battery protection IC 104 enters the normal mode when a high signal is inputted from the port P13, and enters the standby mode when a low signal is inputted from the port P13.

An overcharge signal transmission circuit 111 is provided between the port P11 and the port P6. The overcharge signal transmission circuit 111 has an FET 12. Upon determining that one of the secondary cells 102B has a voltage greater than or equal to the prescribed upper limit, the battery protection IC 104 transmits a high signal from the port P11 to the overcharge signal transmission circuit 111. The high signal turns the FET 12 of the overcharge signal transmission circuit 111 on, causing the overcharge signal transmission circuit 111 to transmit a low signal, i.e., an overcharge signal, to the port P6.

An overcharge signal shutdown circuit 210 is provided between the gate of the FET 12 and the port P11. The overcharge signal shutdown circuit 210 includes an FET 18, an FET 16, and a resistor 116R and a capacitor 116C constituting an RC circuit 116 disposed between the gate and source of the FET 16. The voltage A is applied to the FET 16. Hence, when the voltage A is 0, the FET 16 and the FET 18 are off. Since the path between port P11 and ground is interrupted when the FET 16 and the FET 18 turn off, the battery protection IC 104 does not consume power.

An overdischarge signal transmission circuit 112 is provided between the port P12 and the port P7. The overdischarge signal transmission circuit 112 has an FET 13. Upon determining that one of the secondary cells 102B has a voltage less than or equal to the prescribed lower limit, the battery protection IC 104 transmits a high signal from the port P12 to the overdischarge signal transmission circuit 112. The high signal turns the FET 13 of the overdischarge signal transmission circuit 112 on, causing the overdischarge signal transmission circuit 112 to transmit a low signal, i.e., an overdischarge signal, to the port P7.

An overdischarge signal shutdown circuit 220 is provided between the gate of the FET 13 and the port P12. The overdischarge signal shutdown circuit 220 includes an FET 15, an FET 17, and a resistor 117R and a capacitor 117C constituting an RC circuit 117 disposed between the gate and source of the FET 17. The voltage A is applied to the FET 15. Hence, when the voltage A drops, the FET 15 and the FET 17 are turned off. Since the path between port the P12 and ground is interrupted when the FET 15 and the FET 17 turn off, the battery protection IC 104 does not consume power.

A switching circuit 150 is provided for switching the battery protection IC 104 between the normal mode and the standby mode. The switching circuit 150 has an FET 8 and an FET 9. The drain of the FET 9 is connected to the gate of the FET 8 via a resistor. The drain of FET 8 is connected to Vdd and the source of the FET 8 is connected to the port 13. The voltage A is applied to the gate of the FET 9 through a resistor. When the user presses a switch SW, when the battery temperature rises to at least the prescribed temperature for any reason causing the thermal protector switch 230 to turn on, or when the charging device 300 applies a charging voltage to the step-down circuit 117 via the charging path 135, the voltage A applied to the gate of the FET 9 through the resistor causes the FET 8 to turn on.

When the FET 8 turns on, the switching circuit 150 transmits a high signal to the port P13 of the battery protection IC 104, setting the battery protection IC 104 to the normal mode for monitoring overdischarge and overcharge in the battery set 102. On the other hand, if the switching circuit 150 transmits a low signal to the port P13, the battery protection IC 104 is set to the standby mode.

In the standby mode, the battery protection IC 104 does not monitor overdischarge and overcharge in the battery set 102 and, hence, enters an ultralow power consumption state or does not consume any power, as described above. However, the ports P11 and P12 are maintained in a high-signal state, for example, as a state for warning the user of overcharge and overdischarge, respectively. Note that this is merely an example, and the high-signal state may be used to indicate a normal state, while a low-signal or a no-signal state is used to indicate an abnormal state, such as overcharge and overdischarge.

The voltage A is in a low state when (1) the switch SW is off, (2) the battery voltage drops due to power consumption by the power tool 200, or (3) the battery pack 100 is disconnected from the charging device 300 during a charging operation and the battery voltage is not sufficiently high. Consequently, the gate of the FET 9 enters a low state, turning the FET 9 off. At this time, the battery protection IC 104 is in the standby mode.

Further, the overcharge signal shutdown circuit 210 and the overdischarge signal shutdown circuit 220 respectively interrupt the connections between the port P11 and ground and between the port P12 and ground due to the drop in the voltage A. In this way, the electric current from the ports P11 and P12 is interrupted while the ports P11 and P12 maintain a high state indicating overvoltage and overdischarge, respectively. This arrangement eliminates power consumption between the port P11 and ground and between the port P12 and ground, thereby reducing overall power consumption in the battery pack 100.

Further, if the power tool 200 detects a high temperature and turns on, for example, or if another unusual event occurs, the microcomputer 103 is activated. Moreover, when the overcharge signal shutdown circuit 210 and the overdischarge signal shutdown circuit 220 carry a current owing to the voltage A, the battery protection IC 104 immediately outputs an overcharge signal or an overdischarge signal from the ports P11 or P12, respectively. Accordingly, the microcomputer 103 can receive an overcharge signal or an overdischarge signal when an error (unusual state) occurs and can prevent the output from the battery set 102 using the FET 1, the FET 2, the FET 7, and the FET 14.

Note that the FET 16 and the FET 17 do not turn on after the voltage A is applied to the same for a prescribed time based on the time constant of the respective RC circuits 116 and 117. Put another way, the time required to start up the battery protection IC 104 after the voltage A becomes high is shorter than the time required for the FET 14 and the FET 15 to turn on after the voltage A becomes high level. Hence, the battery protection IC 104 starts up and confirms that there are no errors (unusual states, such as overcharge and overdischarge) with the battery set 102 during the time period after the voltage A switches to high level and before the FET 14 and the FET 15 turn on. If no errors (unusual states) are detected in the battery set 102, the battery protection IC 104 changes the output from the ports P11 and P12 to the low state.

In this way, the battery protection IC 104 can prevent an overcharge signal and an overdischarge signal from being mistakenly transmitted to the microcomputer 103 before confirming that there are no errors (unusual states) in the battery set 102. Hence, the battery pack 100 of the embodiment can prevent the microcomputer 103 from mistakenly determining that the battery set 102 is in an unusual state when the battery set 102 is actually in a normal state.

A battery voltage detection circuit 160 is provided for detecting the voltage of the battery set 102 and for outputting detection results to the port P5 of the microcomputer 103.

The microcomputer 103 interrupts power supply by turning off the FET 1, the FET 2, the FET 7, and the FET 14, and most particularly the FET 1 and the FET 14, in the following cases: (1) when the output voltage detection circuit 70 detects a voltage larger than or equal to a prescribed voltage relative to the reference potential G1 while the battery pack 100 is outputting power to the power tool 200, (2) when the battery protection IC 104 outputs an overdischarge signal while the battery set 102 is outputting power to the power tool 200, and (3) when the short-circuit current detection circuit 119 detects a short circuit. If battery voltage detection circuit 70 detects a voltage lower than or equal to another prescribed voltage relative to the reference potential G1, the microcomputer 103 may interrupt power supply by turning off the FET 1, the FET 2, the FET 7, and the FET 14, and most particularly the FET 1 and the FET 14. Here, another prescribed voltage is lower than the prescribed voltage.

If the battery protection IC 104 outputs an overcharge signal while the battery set 102 is being charged, the microcomputer 103 interrupts the charging operation by switching off the FETs 1, 2, 7, and 14, and most particularly the FETs 2 and 7.

Next, a process for preventing inrush current during a discharge operation on the battery pack 100 will be described with reference to FIG. 2. This process is performed at the beginning of an operation to discharge electricity to the power tool 200 connected to the battery pack 100 in order to prevent an inrush current from flowing to high-capacity (on the order of 500 (micro farad), for example) capacitors in the power tool 200.

Figure 2:
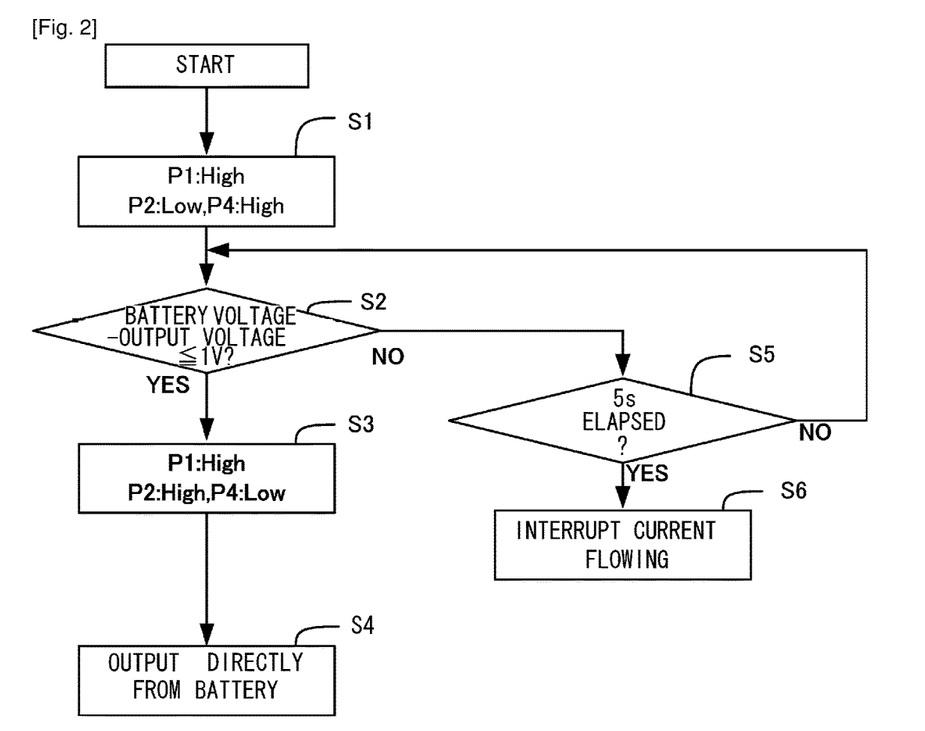
FIG. 2 is a flowchart illustrating a discharge operation of the battery pack according to the embodiment.

In S1 at the beginning of the process in FIG. 2, the user turns on the switch SW, which turns on the FET 10 and starts the microcomputer 103. The microcomputer 103 transmits a high-level signal to both the ports P4 and P1, turning on the FET 5 and FET 2. At this time the port P2 is in a low state and, hence, the FET 1 is off. Consequently, electricity is conducted along the second path 132 and third path 133. Further, the voltage B is applied to the FETs 7 and 14 through resistors, turning the FETs 7 and 14 on, and conducting electricity along the low-side output path 136. As a result, power from the battery set 102 is outputted to the positive output terminal 120 through the second path 132 and the third path 133. The resistor 115 provided on the second path 132 limits the current flowing thereon so that the capacitors in the power tool 200 are charged with a small current.

In S2 the microcomputer 103 compares the detection results from the output voltage detection circuit 70 and the battery voltage detection circuit 160 to determine whether the difference between the voltage of the battery set 102 (or rated voltage) and the output voltage is no greater than 1 V, for example. If the difference in voltages is no greater than 1 V (S2: YES), indicating that the capacitors in the power tool 200 are sufficiently charged, in S3 the microcomputer 103 maintains the output from the port P1 at a high state to keep the FET 2 on, and further outputs a low signal from the port P4 and a high signal from the port P2 to turn off the FET 5 and turn on the FET 1. This operation interrupts the current supplied on the second path 132 and conducts current on the first path 131 and the third path 133. Consequently, in S4 output from the battery set 102 can be supplied directly to the positive output terminal 120 via the first path 131 and the third path 133, allowing the power tool 200 to operate normally (normal motor rotations and the like). Instead of employing the method of determining the voltage described above, the microcomputer 103 may be configured to simply turn off the FET 5 and turn on the FET 1 after a predetermined time (100 msec, for example).

However, if the microcomputer 103 determines in S2 that the difference in battery voltage and the output voltage is greater than 1 V (S2: NO), in S5 the microcomputer 103 determines whether a prescribed time (5 sec, for example) has elapsed since the timing of S1 (the timing at which the microcomputer 103 was started). This prescribed timing may be any preset value commensurate with a sufficient amount of time for charging the capacitors of the power tool 200. If the microcomputer 103 determines in S5 that the prescribed time has not elapsed (S5: NO), the process returns to S2. However, if the microcomputer 103 determines in S5 that the prescribed time has elapsed (S5: YES), in S6 the microcomputer 103 determines that an error (or unusual state) has occurred and interrupts the current flowing on the output paths by switching off the FETs 1, 5, 2, 7, and 14.

Figure 3:
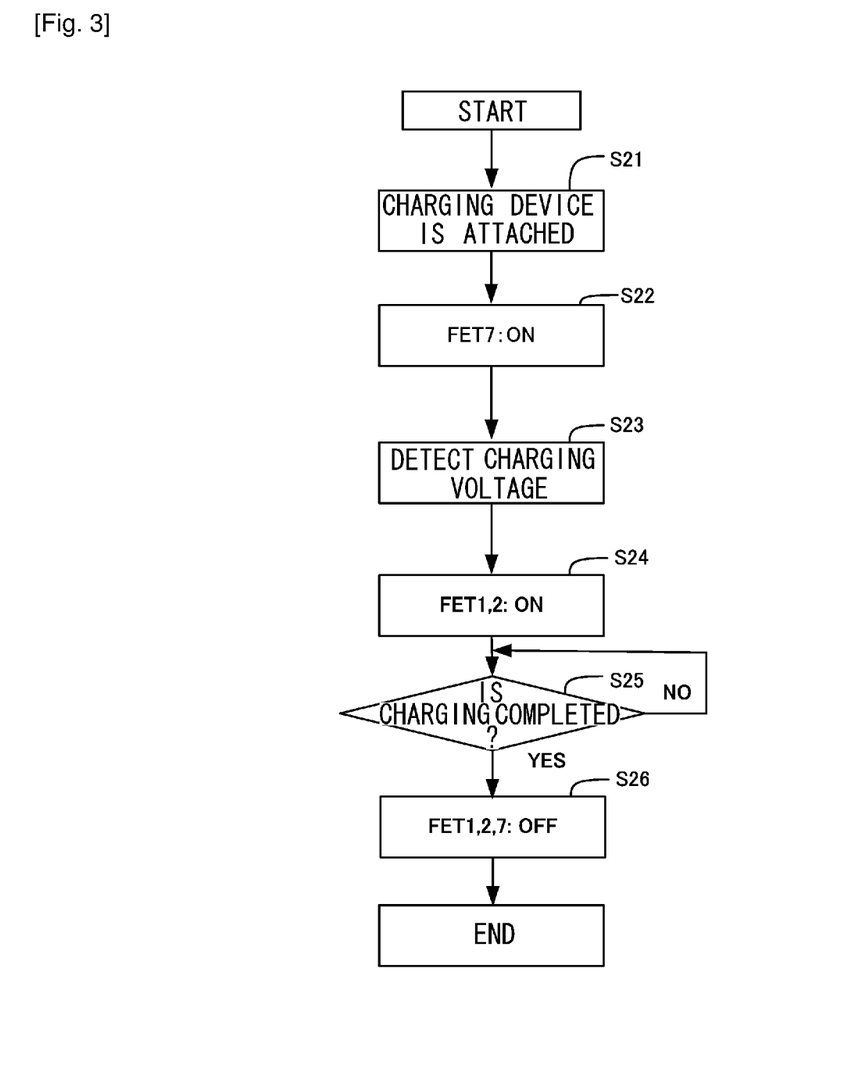
FIG. 3 is a flowchart illustrating a charging control process of the battery pack according to the embodiment.

Next, a charging control process will be described with reference to FIG. 3. Note that the FETs 1, 2, 7, and 14 in the battery pack 100 are in an off state when the user has switched off the switching circuit 140 (the switch SW) and nothing is mounted on the positive output terminal 120. In S21 of the process in FIG. 3, the battery pack 100 is attached to the charging device 300. Through this operation, the voltage produced by the charging device 300 is inputted into the step-down circuit 117 through the positive output terminal 120 and the charging path 135. The step-down circuit 117 steps down the inputted voltage and outputs the lower voltage to the microcomputer 103, thereby powering the microcomputer 103.

In S22 the voltage supplied by the charging device 300 is divided by the resistors 141 and 142, and the resulting divided voltage B is applied to the FETs 7 and 14, turning on the FET 7 and FET 14. As a result, the low-side output path 136 becomes conductive. In S23 the microcomputer 103 determines through the output voltage detection circuit 70 that a charging voltage has been inputted, and in S24 outputs a high-level signal from the ports P1 and P2 to turn on the FET 1 and FET 2 in order to execute a charging operation. Through this operation, a charging voltage is applied to the battery set 102 and charging commences.

In S25 the microcomputer 103 determines whether charging has completed and remains in a standby state while charging has not completed (S25: NO). When charging has completed (S25: YES), in S26 the microcomputer 103 turns off the FETs 1, 2, 7, and 14 and ends the charging control process.

The battery pack 100 according to the embodiment described above interrupts the supply of power on the high side of the battery set 102 with the shutdown circuits 105, 106, and 107 and interrupts the supply of power on the low side of the battery set 102 with the low-side shutdown circuits 109A and 109B. This configuration can reliably interrupt the power supply when a short circuit occurs in the output line. Sufficient measures are needed for preventing currents near peak levels from flowing to the FETs, particularly in battery packs having a large output since the voltage applied to the FETs can become high and the current large. By providing independent shutdown circuits on both the high side and low side of the battery set, as described in the embodiment, it is possible to interrupt the power supply with one shutdown circuit, even when a problem occurs with the other shutdown circuit, thereby more reliably interrupting current flow in the event of an error (unusual state).

Further, current on the high side is interrupted using the p-channel FETs 1, 2, and 5, while current on the low side is interrupted using the n-channel FETs 7 and 14. In other words, current flow on the high side and the low side is interrupted using FETs with different properties, thereby doubling protection as opposed to a configuration having FETs only on one of the high side and the low side. In addition to this configuration, it is preferable to provide another element, such as a fuse that melts in order to interrupt the circuit, having a threshold that is equal to or greater than the allowable peak current of the FETs.

When the battery pack 100 of the embodiment is discharging to power the power tool 200, the voltage from the battery set 102 is first applied along the second path 132, having the resistor 115, and the third path 133 and subsequently is applied directly to the power tool 200 along the first path 131 and the third path 133. In this way, the resistor 115 provided on the second path 132 limits inrush current to the power tool 200 that can occur during startup or when the power tool 200 is first connected to the battery pack 100.

With the battery pack 100 according to the embodiment described above, the overcharge signal shutdown circuit 210 disconnects the port P11 from ground and the overdischarge signal shutdown circuit 220 disconnects the port P12 from ground when the battery protection IC 104 is in its standby mode. This configuration serves to interrupt current flowing from the ports P11 and P12, while maintaining these ports in a high-level state to indicate a warning for overvoltage and overdischarge, respectively. Accordingly, power consumption is eliminated between the port P11 and ground and between the port P12 and ground, thereby reducing overall power consumption of the battery pack 100. Further, since the states of the ports P11 and P12 indicate warnings for overvoltage and overdischarge while the battery protection IC 104 is in standby mode, charging or discharging cannot be performed until the battery protection IC 104 actively cancels the warnings.

While the configuration in the embodiment described above has a shutdown circuit on both the high side and low side, the present invention may be applied to a configuration that provides a plurality of shutdown circuits configured primarily of FETs with different properties on the high side, but none on the low side; or conversely a configuration that provides a plurality of shutdown circuits on the low side, but none on the high side. Alternatively, a shutdown circuit may be provided on each of the high and low sides, as described in the embodiment, while a plurality of such shutdown circuits comprising primarily FETs of differing properties are provided on one or both of the high and low sides.

REFERENCE SIGN LIST

102 battery set
103 microcomputer
104 battery protection IC
105, 106, 107 shutdown circuit
109A, 109B low-side shutdown circuit
210 overcharge signal shutdown circuit
220 overdischarge signal shutdown circuit

The invention claimed is:

1. A power-supplying device comprising:
a terminal having a plus side and a minus side, configured to be connected to an external device;
a rechargeable battery configured to output electrical power to the external device via the terminal;
a first shutdown circuit positioned at a plus side of the rechargeable battery, the first shutdown circuit being configured to interrupt electricity over a first path between the rechargeable battery and the plus side of the terminal;
a second shutdown circuit positioned at a minus side of the rechargeable battery, the second shutdown circuit being configured to interrupt electricity over a second path between shutdown output of the rechargeable battery and the minus side of the terminal;
a controller configured to control the first shutdown circuit and the second shutdown circuit;
a step-down circuit configured to apply a prescribed voltage to the controller, the stepdown circuit configured to be connected to an external charging device through a third path; and
a first switching circuit, wherein the step-down circuit is further configured to be connected to the rechargeable battery via the first switching circuit, and the controller is configured to control the first switching circuit to turn on and off electrical connection between the rechargeable battery and the step-down circuit, wherein the step-down circuit receives power supply from one of the external charging device and the rechargeable battery when the first shutdown circuit interrupts electricity over the first path.

2. The power-supplying device according to claim 1, further comprising a detector configured to detect voltage of the rechargeable battery and an output current of the rechargeable battery,
wherein the controller is connected to the detector, the first shutdown circuit, and the second shutdown circuit, and
wherein the controller controls at least one of the first shutdown circuit and the second shutdown circuit to shutdown the output of the rechargeable battery when the detector detects at least one of three conditions such that (i) the voltage of the rechargeable battery is higher than or equal to a prescribed first voltage, (ii) the voltage of the rechargeable battery is lower than or equal to a prescribed second voltage that is lower than the prescribed first voltage, and (iii) the output current is greater than or equal to a prescribed current.

3. The power-supplying device according to claim 2, wherein the controller has a first reference voltage and the second shutdown circuit has a second reference voltage, the second reference voltage being different from the first reference voltage, the first prescribed voltage being defined relative to the first reference voltage.

4. The power-supplying device according to claim 3, further comprising a control signal outputting unit connected to the controller and configured to output a control signal controlling the second shutdown circuit to shutdown the output of the rechargeable battery based on a signal from the controller while the control signal outputting unit electrically isolates the controller and the second shutdown circuit.

5. The power-supplying device according to claim 4, wherein the control signal outputting unit includes a photocoupler.

6. The power-supplying device according to claim 1, wherein the first shutdown circuit includes a shutdown portion configured to switch on and off the output of the rechargeable battery and a drive portion configured to drive the shutdown portion by a switching operation, the drive portion performs on/off switching action faster than the shutdown portion.

7. The power-supplying device according to claim 1, further comprising:
- a first path through which a first current flows from the rechargeable battery, the first path being positioned between the plus side of the rechargeable battery and the terminal;
- a second path through which a second current larger than the first current flows from the rechargeable battery, the second path being positioned between the plus side of the rechargeable battery and the terminal, the second path being parallel to the first path; and
- a selecting unit configured to select one of the first path and the second path;
- wherein the shutdown circuit electrically connects the rechargeable battery and the selected one of the first path and the second path such that a current from the rechargeable battery flows through the selected one of the first path and the second path, and electrically disconnects the rechargeable battery from a remaining one of the first path and the second path.

8. The power-supplying device according to claim 7, wherein the second path includes a current limiter.

9. The power-supplying device according to claim 1, further comprising:
- a monitoring unit having an output port and configured to be switched between a monitoring mode and a standby mode, wherein in the monitoring mode the monitoring unit monitors voltage of at least one of the plurality of battery cells, and outputs a signal via the output port when the voltage of one of the plurality of battery cells is in a prescribed first range; and
- a monitor shutdown circuit configured to interrupt the signal via the output port when the monitoring unit is in the standby mode.

10. The power-supplying device according to claim 9, further comprising a switch by which a user activates the monitoring unit,
- wherein the terminal is further configured to be connected to the charging device,
- wherein the monitoring unit shifts from the standby mode to the monitoring mode, (1) when the terminal is connected to the charging device, (2) when the user activates the monitoring unit by the switch, or (3) when the terminal outputs electric power to the external device.

11. The power-supplying device according to claim 10, wherein the output port maintains a state when the output port outputs the signal, provided that the monitoring unit is in the standby mode.

12. The power-supplying device according to claim 1, wherein the rechargeable battery includes a plurality of battery cells, the rechargeable battery being configured to output electrical power to the external device when connected to the terminal and configured to be charged by the charging device when connected to the terminal, the power-supplying device further comprising:
- a monitoring unit having an output port and configured to be switched between a monitoring mode and a standby mode, wherein in the monitoring mode the monitoring unit monitors voltage of at least one of the plurality of battery cells, and outputs a signal via the output port to the controller when the voltage of one of the plurality of battery cells is in a prescribed first range; and
- a shutdown circuit configured to interrupt the signal via the output port when the monitoring unit is in the standby mode,
- wherein the step-down circuit is further configured to be connected to the rechargeable battery via the first switching circuit,
- wherein the controller is configured to control the first switching circuit to turn on and off electrical connection between the rechargeable battery and the step-down circuit, and
- wherein when the prescribed voltage is not applied to the controller, the monitoring unit shifts to the standby mode.

13. The power-supplying device according to claim 1, wherein the rechargeable battery includes a plurality of battery cells,
- wherein when the controller detects overdischarge of a battery cell among the plurality of battery cells, at least one of the first shutdown circuit and the second shutdown circuit interrupts electricity over at least one of the first path and the second path corresponding to the at least one of the first shutdown circuit and the second shutdown circuit.

14. The power-supplying device according to claim 1, wherein the rechargeable battery includes a plurality of battery cells,
- wherein when the controller detects overcharge of a battery cell among the plurality of battery cells, at least one of the first shutdown circuit and the second shutdown circuit interrupts electricity over at least one of the first path and the second path corresponding to the at least one of the first shutdown circuit and the second shutdown circuit.

15. The power-supplying device according to claim 1, wherein the prescribed voltage is for driving the controller,
- Wherein when the prescribed voltage is not applied to the controller by the step-down circuit, at least one of the first shutdown circuit and the second shutdown circuit interrupts electricity over at least one of the first path and the second path corresponding to the at least one of the first shutdown circuit and the second shutdown circuit.

16. The power-supplying device according to claim 1, further comprising:
- a second switching circuit configured to control the first shutdown circuit to be in a state among a first state and a second state, wherein in the first state the first shutdown circuit interrupts electricity over the first path, in the second state the first shutdown circuit does not interrupt electricity over the first path; and
- a third switching circuit configured to control the second shutdown circuit to be in a state among a third state and a fourth state, wherein in the third state the second shutdown circuit interrupts electricity over the second path, and in the fourth state the second shutdown circuit does not interrupt electricity over the second path,
- wherein property under an allowable peak current in the first shutdown circuit is different from that in the second shutdown circuit.

17. The power-supplying device according to claim 1, wherein the rechargeable battery includes a plurality of battery cells,
- the power-supplying device further comprising a monitoring unit configured to be switched between a monitoring mode and a standby mode,
- wherein in the monitoring mode the monitoring unit monitors voltage of at least one of the plurality of battery cells and notifies the controller of whether the voltage of at least one of the plurality of battery cells is within a prescribed range, wherein in the standby mode the monitoring unit does not monitor the voltage of at least one of the plurality of battery cells and consumes power lower than that in the monitoring mode,
wherein when the prescribed voltage is not applied to the controller, the monitoring unit shifts to the standby mode.

18. The power-supplying device according to claim 17, wherein the monitoring unit monitors voltages of all of the plurality of battery cells.

19. The power-supplying device according to claim 1, wherein the rechargeable battery includes a plurality of battery cells, each of the plurality of battery cells being a lithium ion battery.

20. A system comprising:
   at least one of a power tool and a charging device; and
   a power-supplying device having:
   a terminal configured to be connected to the at least one of a power tool and a charging device;
   a rechargeable battery including a plurality of battery cells;
   a first path positioned at a plus side of the rechargeable battery and configured to be connected to the at least one of the power tool and the charging device via the terminal;
   a second path positioned at a minus side of the rechargeable battery and configured to be connected to the at least one of the power tool and the charging device via the terminal;
   a third path;
   a fourth path;
   a first shutdown circuit positioned at the plus side of the rechargeable battery, the first shutdown circuit being configured to interrupt electricity over the first path;
   a second shutdown circuit positioned at the minus side of the rechargeable battery, the second shutdown circuit being configured to interrupt electricity over the second path;
   a controller;
   a step-down circuit configured to apply a prescribed voltage to the controller, the step-down circuit configured to be connected to the charging device through the third path and the terminal, and configured to be connected to the rechargeable battery via the fourth path; and
   a third shutdown circuit configured to interrupt electricity over the fourth path,
   wherein the controller is configured to control the first shutdown circuit, the second shutdown circuit, and the third shutdown circuit,
   wherein when the terminal is connected to the charging device, the third path supplies the prescribed voltage to the controller via the step-down circuit,
   wherein when the controller detects overdischarge of at least one of the plurality of battery cells, at least one of the first shutdown circuit and the second shutdown circuit interrupts electricity over at least one of the first path and the second path corresponding to the at least one of the first shutdown circuit and the second shutdown circuit, and
   wherein the step-down circuit receives power supply from one of the external charging device and the rechargeable battery when the first shutdown circuit interrupts electricity over the first path.

* * * * *